United States Patent [19]
Morris

[11] Patent Number: 4,964,878
[45] Date of Patent: Oct. 23, 1990

[54] LEAD-ACID RECHARGEABLE STORAGE BATTERY

[75] Inventor: Chris Morris, Austin, Tex.

[73] Assignee: Electrosource, Inc., Austin, Tex.

[21] Appl. No.: 200,977

[22] Filed: Jun. 1, 1988

[51] Int. Cl.⁵ .......................... H01M 6/48; H01M 6/00
[52] U.S. Cl. .................................... 29/623.1; 429/210; 429/241
[58] Field of Search .................... 429/204, 210, 241; 29/623.1

[56] References Cited

U.S. PATENT DOCUMENTS

| | | | |
|---|---|---|---|
| 3,167,456 | 1/1965 | Schilke et al. | 429/210 |
| 4,331,747 | 5/1982 | Julian et al. | 429/160 |
| 4,353,969 | 10/1982 | Rippel et al. | 429/144 |
| 4,504,556 | 3/1985 | Pearson | 429/210 X |
| 4,507,856 | 4/1985 | Pearson | 29/623.1 |
| 4,525,438 | 6/1985 | Pearson | 429/210 X |
| 4,734,977 | 4/1988 | Blomberg et al. | 429/210 X |

FOREIGN PATENT DOCUMENTS 1430205 9/1973 United Kingdom.
2070844 2/1980 United Kingdom.

Primary Examiner—Stephen J. Kalafut
Attorney, Agent, or Firm—Arnold, White & Durkee

[57] ABSTRACT

An improvement in lead-acid batteries is disclosed. The improvement is directed toward construction of a lead-acid rechargeable battery in which bipolar positive and negatives plates (biplates) share the same grid or substrate. According to the present invention, such biplates are stacked upon each other, separated by interleaved, highly porous glass mat separators. These substratea positioned between the positive and negative plate areas act as electrical connections attaching the plates to terminals of the battery. The battery case cover is used to provide compressive force on the biplates and separators.

24 Claims, 9 Drawing Sheets

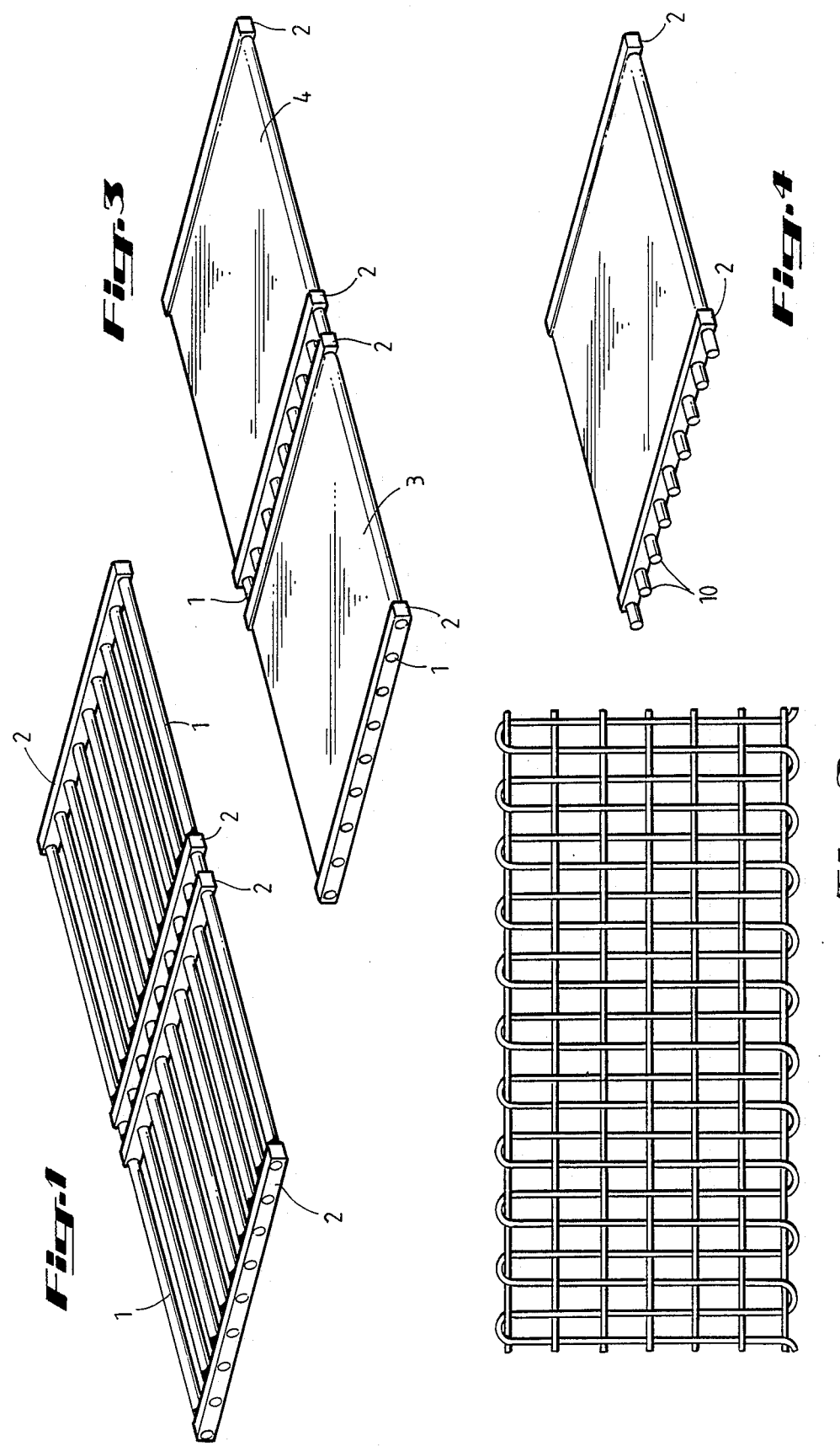

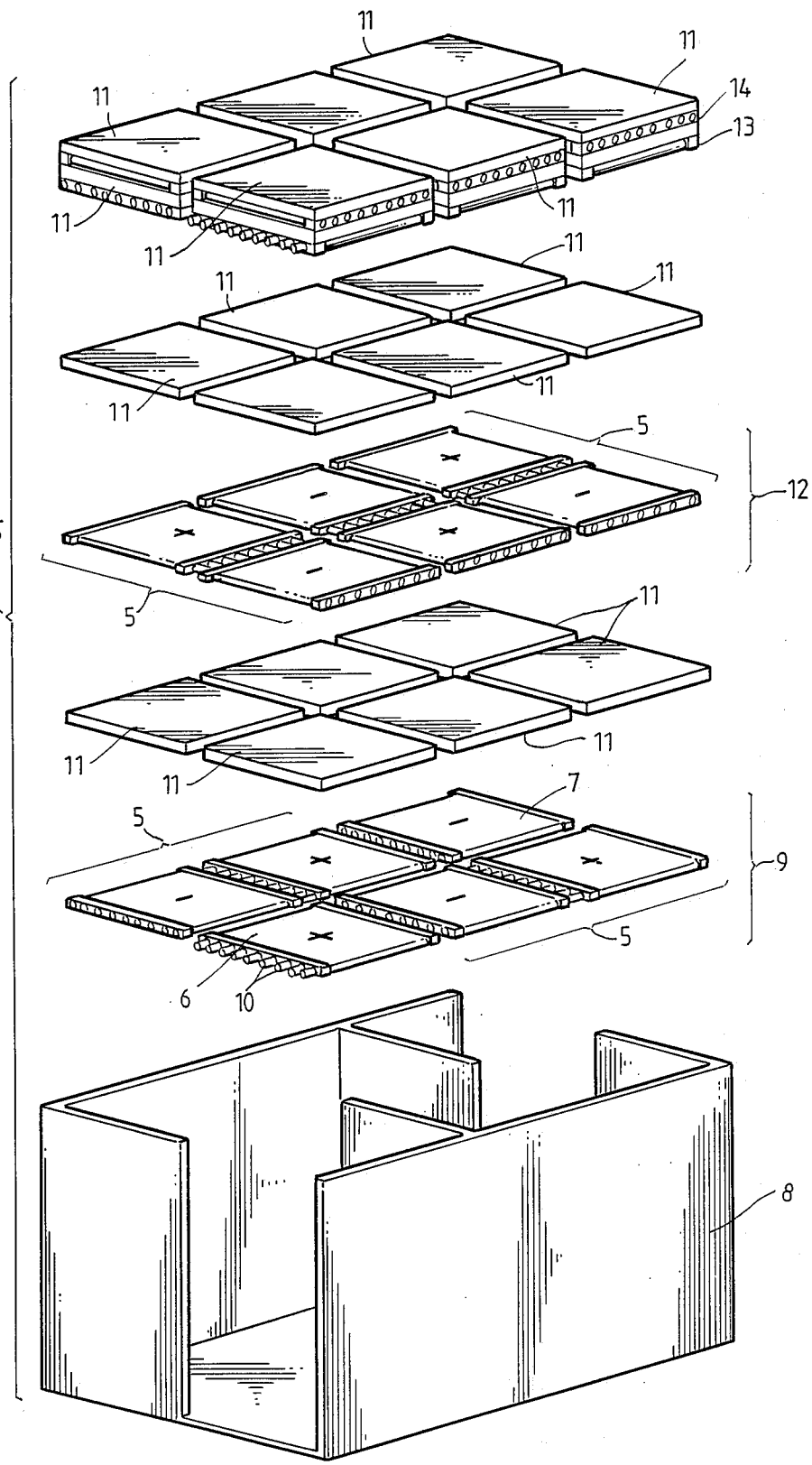

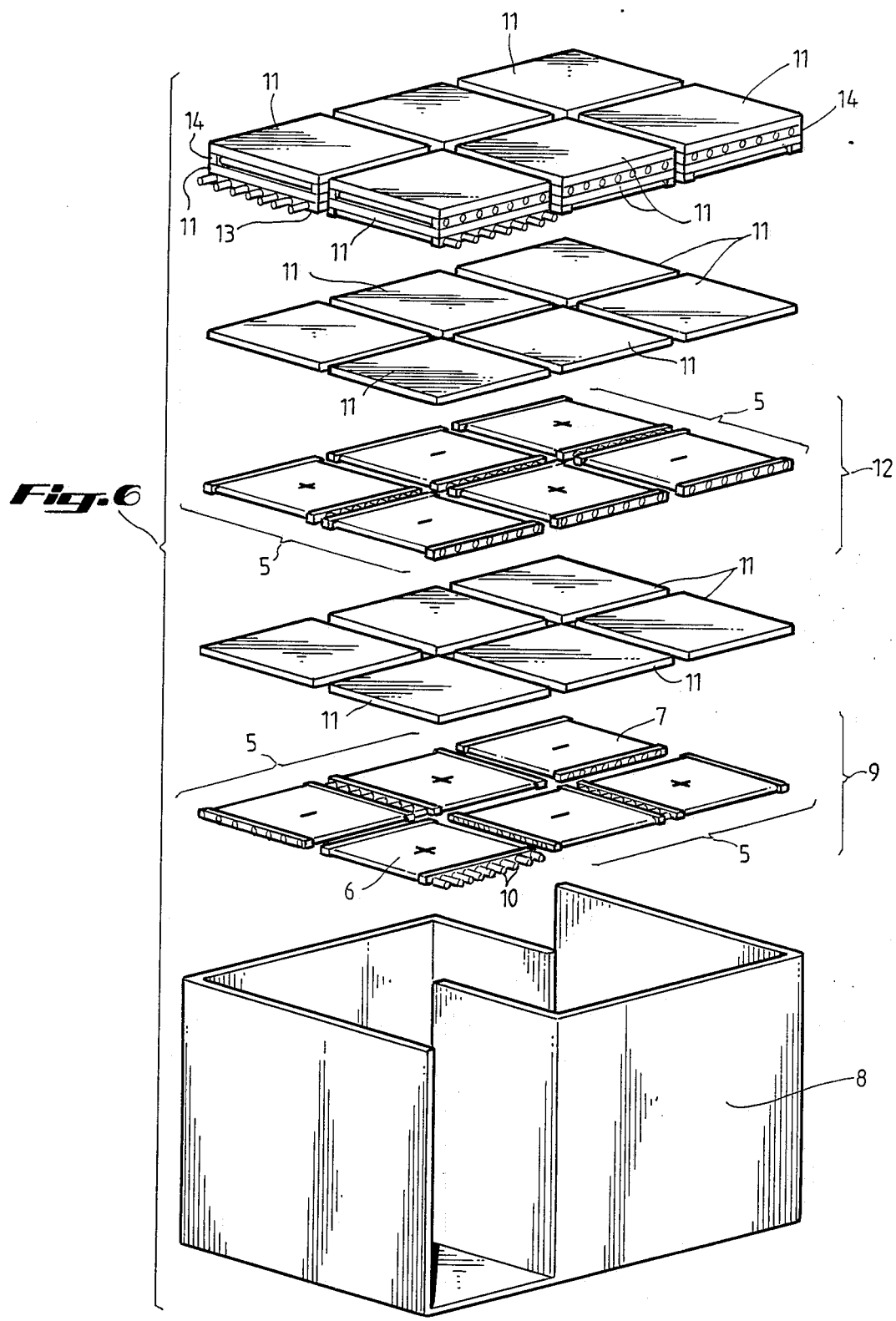

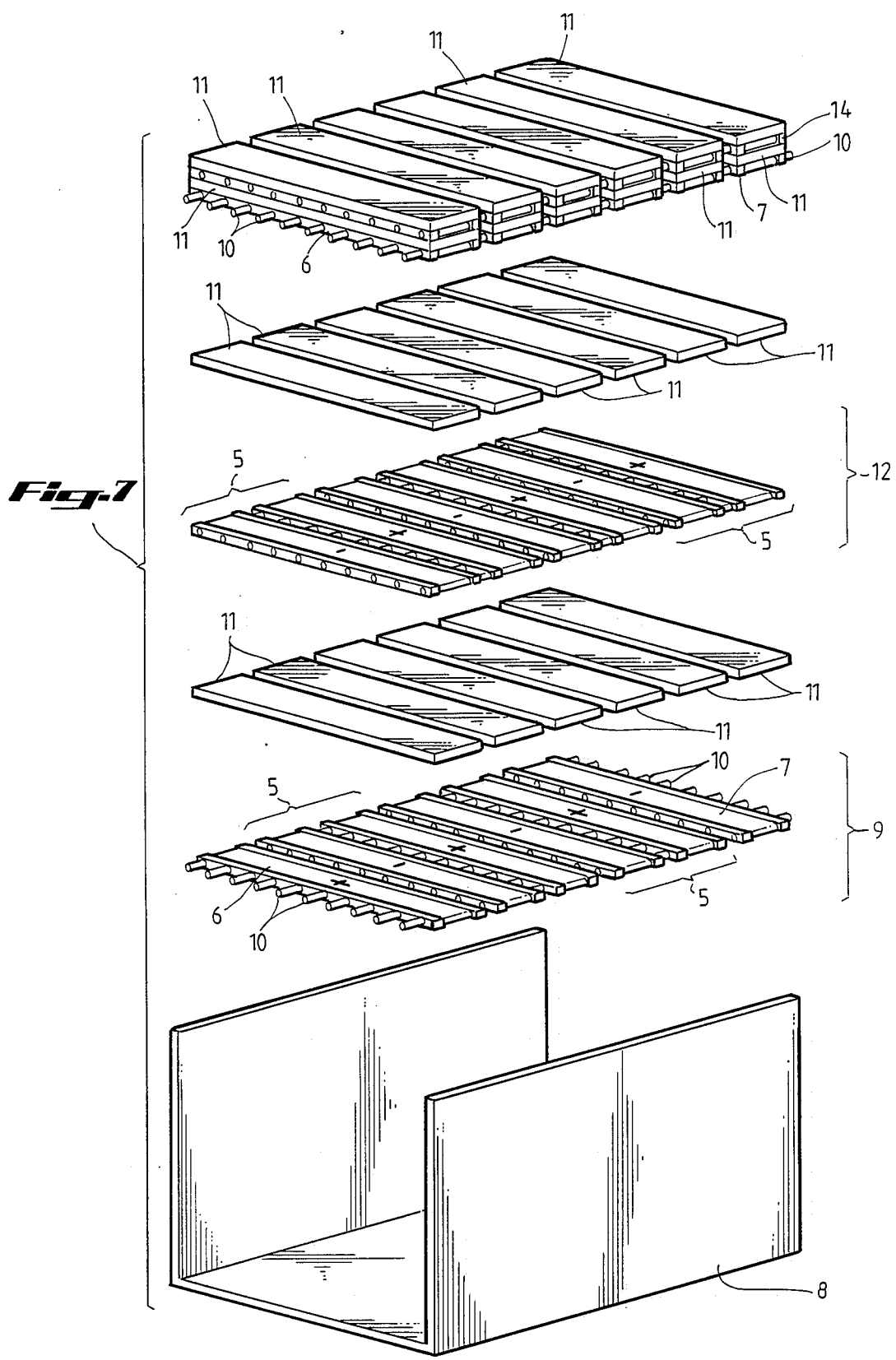

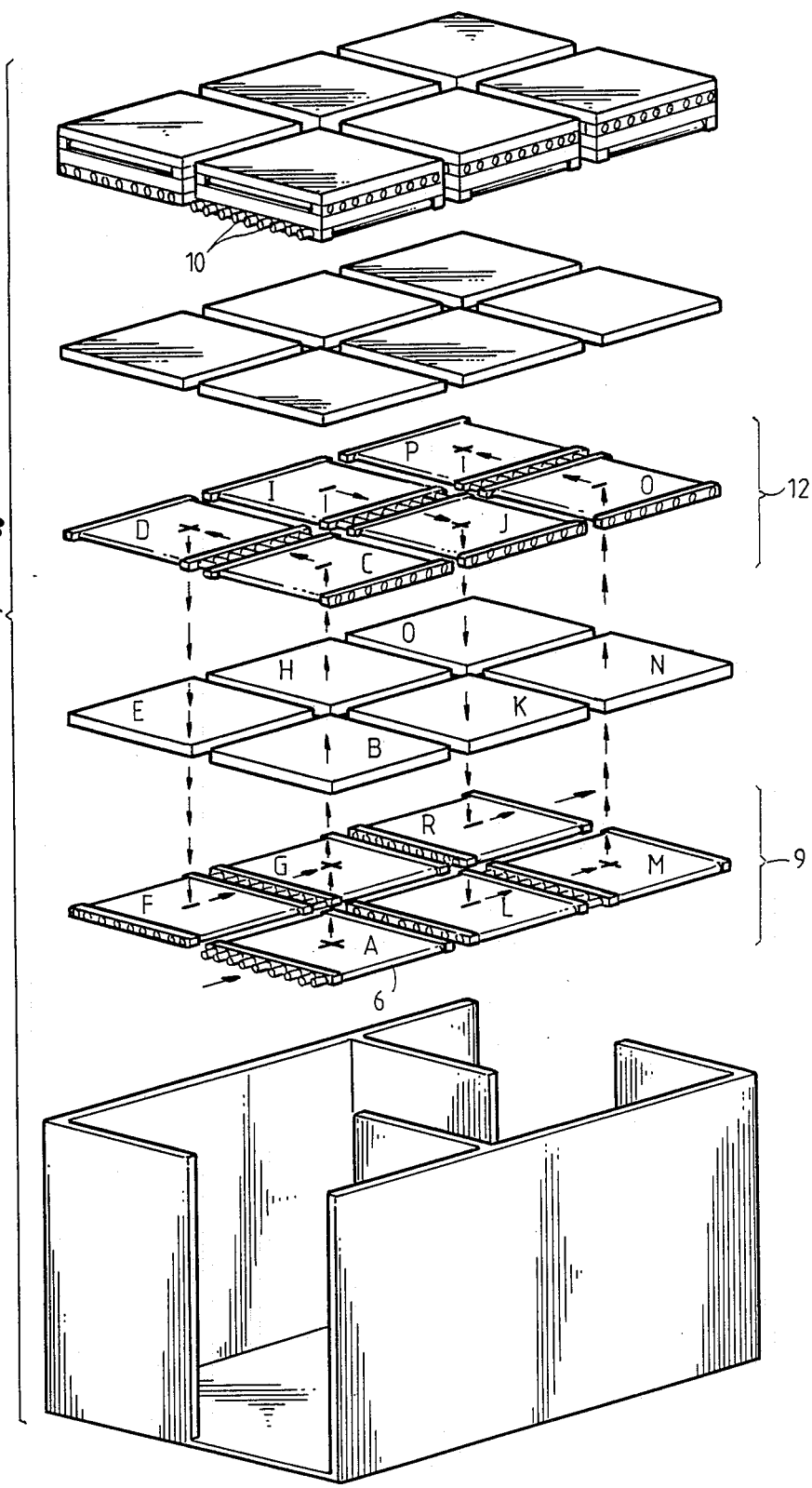

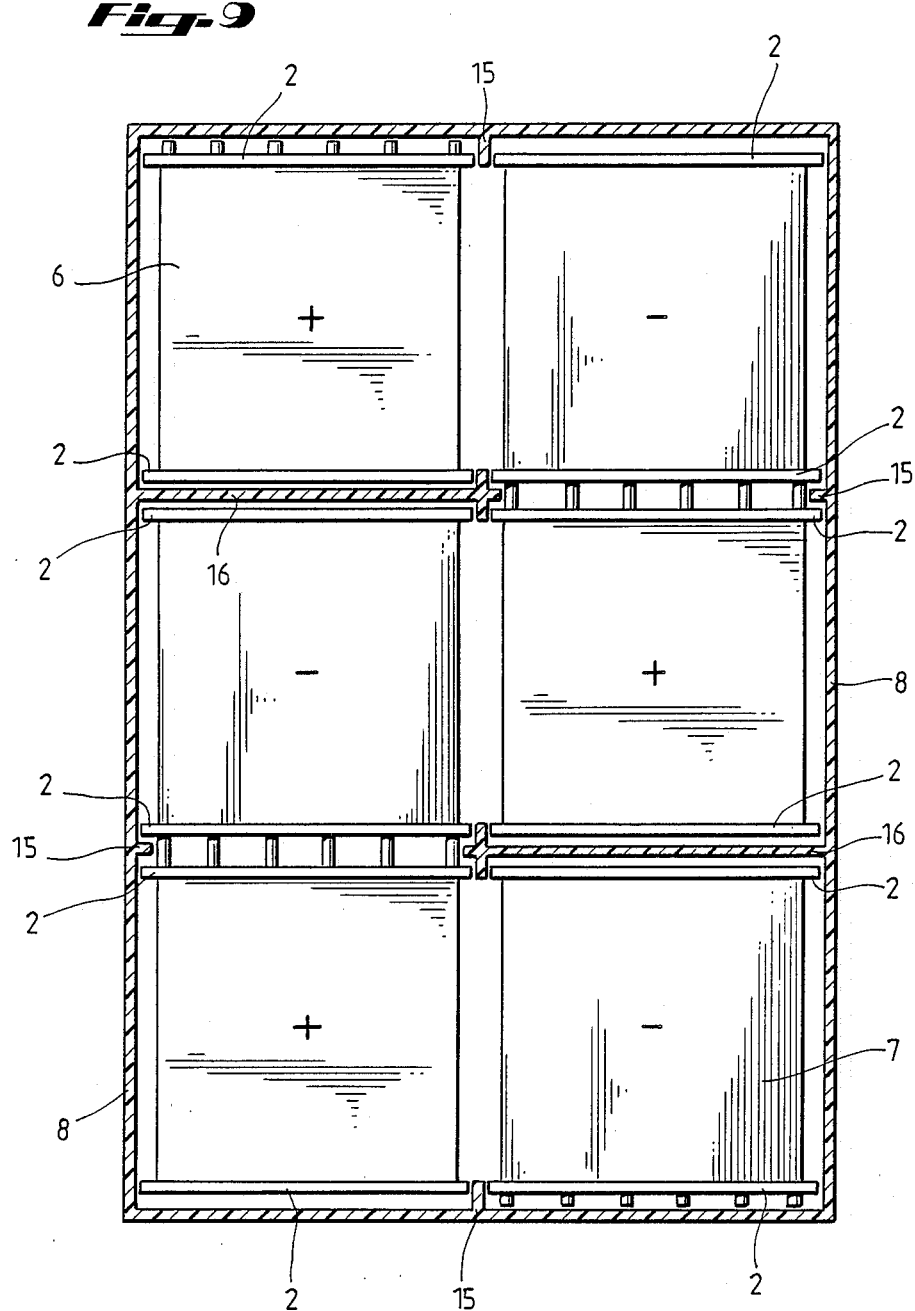

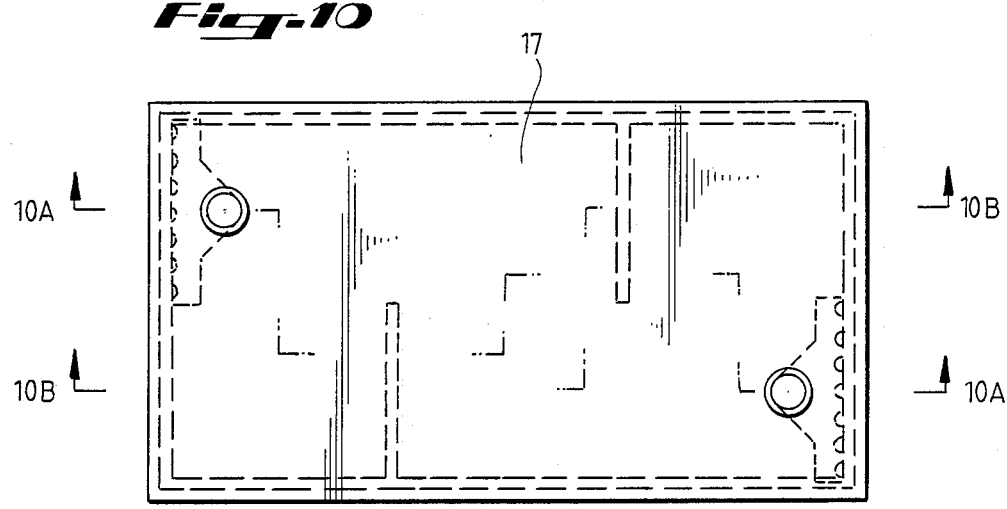
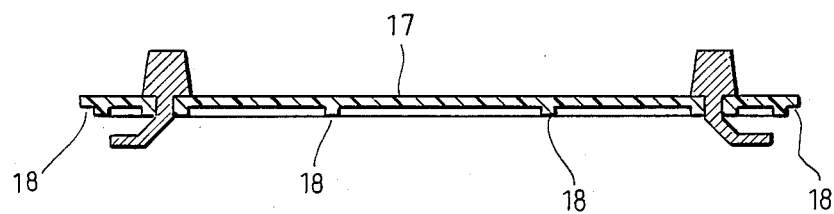
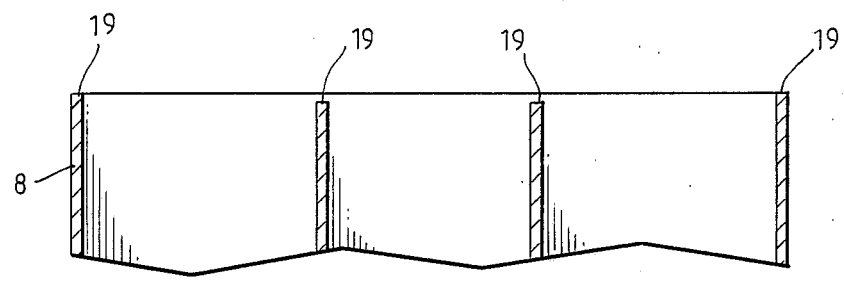

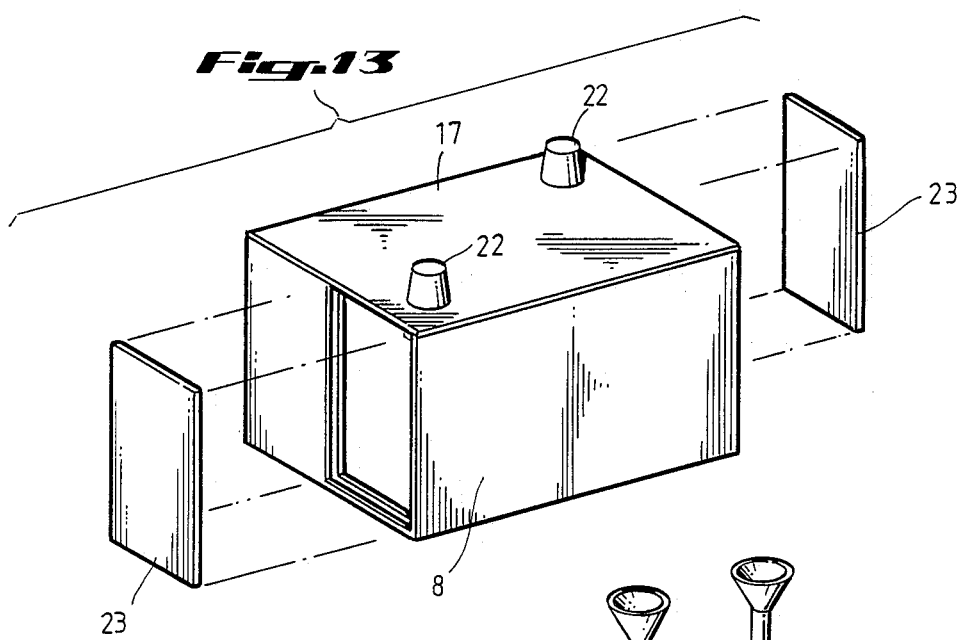
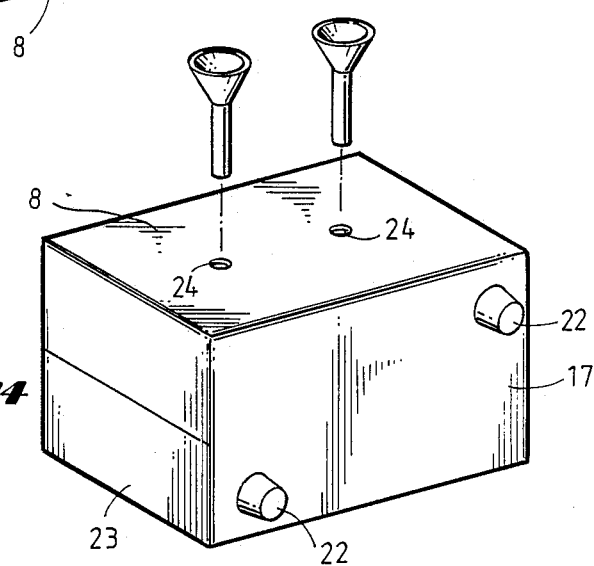
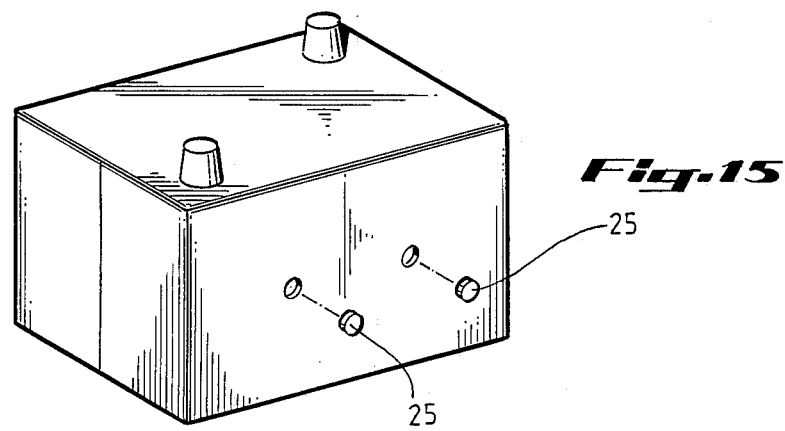

LEAD-ACID RECHARGEABLE STORAGE BATTERY

BACKGROUND OF THE INVENTION

The present invention relates generally to lead-acid rechargeable batteries and, in particular, to batteries in which bipolar positive and negative plates (biplates) share the same grid or substrate. According to the present invention, such biplates and interleaved, highly porous, glass mat separators are stacked upon each other in such a manner that the substrate positioned between the positive and negative plate areas of the biplates act as electrical connections between adjacent stacks.

Conventional lead-acid batteries are constructed from two volt cells which are usually connected in series. This allows these known batteries (whose nominal voltage is a multiple of two, or "in parallel") to give increased ampere-hour capacity for a combination of series and parallel cells. Each cell contains positive and negative plates separated by, in the case of "flooded" cells, sheets of porous, low resistance, and oxidation resistant materials such as glass, paper, rubber, or polyolefin. In the "flooded" cell, the separator exists merely to insulate adjacent positive and negative plates from each other while providing a low resistance path through which electrons may easily flow. Again, in the flooded cell, free electrolyte exists around the plates contained by the walls of the (plastic or hard rubber cell) container.

In cells known as "starved electrolyte" or "sealed recombinant" cells, the electrolyte is contained in highly porous, relatively thick glass mats interleaved between adjacent positive and negative plates. No "free" electrolyte exists in such cells. The electrolyte required to give the rated electrical energy output is stored within the pores of the separators and the pores of the negative and positive active materials.

The separate positive and negative plates in conventional lead-acid batteries comprise a lead or lead alloy grid, or substrate, into which is impressed a paste. Such substrates are manufactured by one of two methods. In one such method molten lead or an alloy thereof is poured into a mold and frozen. The mold is then opened and the resultant casting is stored for between 24 and 48 hours to allow orientation of metallic grain structure. In another known method, lead, or lead alloy, sheet is slit and expanded to the desired width or length on a continuous basis, and is then cut to the desired size.

SUMMARY OF THE INVENTION

The choice of lead alloy for use in the positive and, separately, the negative grid is of great importance in determining both the operating characteristics and life of the battery, under the intended battery service conditions. For instance, a combination of positive and negative alloys will affect the rate that water is lost from batteries during recharge. Further, the positive grid is subjected to varying degrees of electro-chemical corrosion, dependent upon the application in which the battery is used. This electrochemical corrosion can take the form of a corrosion which erodes the positive grid material to a point where the grid material is totally eaten away and the grid is no longer capable of conducting energy from the plate to the external circuit. A second form of corrosion is caused by stress. The formation of certain low density compounds of lead tend to stretch the grid resulting, generally, in loss of contact between the grid and the impressed active material. In order to reduce the effects of this stress, alloy additions such as antimony are used to increase the tensile strength of the grid. It is well documented, however, that additions of antimony increase the "self discharge" and water-loss rates of lead-acid batteries. Those skilled in the art will recognize the inherent advantages of a grid material which minimizes water loss, has high tensile strength, and possesses a very fine grain structure.

In conventional lead-acid cells, unlike those of a cylindrical nature described in U.S. Pat. No. 3,862,861, the positive and negative plates are oriented in a vertical plane with the current conducting tab of each grid (normally one tab is provided per grid) being positioned at the top of the plate. Each of the current conducting tabs of the positive plates within a cell are typically connected together by immersing all tabs into a bath of molten metal and freezing the metal. The resultant connector piece is known as a "cast-on-strap." Similarly, the tabs of all the negative plates of the cell are connected during the same operation.

Because of the need for dissimilar melting temperatures of the tab material and the cast-on-strap metal, different alloys of lead are sometimes used which creates a potential for corrosion at the junction of the tab and cast-on-strap. In as much as there is generally only one conducting tab per grid, the efficiency with which electrical energy is conducted from the various regions of the plate is far from optimum. Those skilled in the art will appreciate the improved conduction efficiency of several conducting tabs per plate (as opposed to one), and the elimination of both the corrosion potential, and, the reduction of manufacturing costs due to the elimination of the cast-on-strap process.

In the manufacture of a 12 volt battery, six cells must be connected in series. This necessitates attaching each of the end cells to the battery terminals and five other cell-to-cell connections. The preferred method of connecting adjacent cells is by extrusion welding the positive cast-on-strap of one cell to the negative cast-on-strap of the adjacent cell through a small hole in a plastic partition separating adjacent cells. The resultant connection is normally referred to as a "through-the-partition" (TTP) connection. Generally, there is only one such connection made to connect adjacent cells. The failure of any one of these TTP welds will result in an open circuit and render the battery useless. It will be recognized that there are significant advantages from improved electrical conductivity and reliability of multiple connections between adjacent cells, including manufacturing cost reductions, by the elimination of the need for TTP connections.

During the manufacture of conventional lead-acid batteries, the positive and negative grids and plates are subjected to a significant amount of handling. For example, grids emerging from the casting process are stacked and, normally, stored in dedicated areas during the grain orientation process. Grids are handled again as they are fed into the pasting process, and again as they are stacked as "wet plates" in preparation of the paste curing and drying process. The curing and drying process is one in which applied paste is changed from a "mud" consistency to one of dry "concrete" so that the dried plate is handleable during subsequent processes. Plates are again handled during the plate and separator stacking process, and again during the cast-on-strap process. Following this latter process, the connected groups of plates are normally inserted into the battery containers. Those skilled in the art will recognize advantages in reducing work-in-process and materials handling requirements; and in the reduction in potential for plate damage where the plate and battery design allows the plates to be inserted in the container immediately following the pasting process.

The optimum performance and life of lead-acid batteries of the "starved electrolyte" or "recombinant" type are dependent upon many factors, including applying continuous equal pressure over the whole area of the positive and negative plates. Conventional thermoplastic battery containers necessarily have a draft angle which allows the male part of the injection mold to be withdrawn to enable the container to be ejected from the mold. As a consequence, the top of each of the cell compartments in, for example, a 12 volt battery container is wider than the bottom of the compartment. Those skilled in the art will again recognize the advantage of providing equal, controlled, pressure over the whole plate area. This is made possible by horizontal orientation of the plates within the battery. The controlled pressure being provided by the use of non-conducting plastic screeds in each plate, and the sealing of the battery cover to the battery container.

According to the present invention, all stacks of plates share the same environment such that a novel recombinant battery is provided. U.S. Pat. No. 3,862,861 discloses an early design of a recombinant-type cell in which lead based grids of greater than 99.9% purity (by weight, and thereby having a high hydrogen "over-potential") are pasted and assembled into cells which are tightly contained by a cell container and cover. U.S. Pat. No. 4,166,155 addresses the need for differing lead alloys in the positive and negative grids to achieve a maintenance free, lead-acid battery wherein the tensile strength of the positive grid is increased by the additions of antimony and cadmium, while limiting the gas evolution associated with constant voltage overcharge.

Several other patents address the use of biplates in the construction of lead-acid batteries. For instance, U.S. Pat. No. 4,275,130 discloses a battery in which the electrodes take the form of parallel, stacked biplates composed of a thermoplastic material (such as polypropylene) with conductive fibers of carbon or metal embedded in it to strengthen conducting elements. Each biplate is provided with parallel strips of lead in electrical contact with the conductive fibers to serve as a grid. The active material is held between thin, porous glass mats; and the stacked assembly is then axially compressed and assembled into the battery case.

In consideration of the advantages provided by increased electrical performance; reductions in battery manufacturing costs, work-in-process inventory (and thereby working capital requirements), manufacturing process time; and the elimination of certain processes known to cause premature service failure, it is a further object of the invention to provide a substrate for use in a lead-acid battery biplate, manufactured from one continuous length or several separate lengths of coextruded wire, as described in U.S. Pat. No. 4,658,623 (hereby incorporated by reference).

It is yet another object of the invention to incorporate in the substrate strips corrosion resistant, lightweight, thermoplastic or similar material to locate and retain the wires in the substrate, and to accurately position the plate in the battery container.

It is still another object of this invention to provide a means of utilizing the common grid framework to facilitate intercell connections.

It is yet another object of this invention to use the previously mentioned plastic screeds in the grid structure to equalize the axial pressure among each stack of plates when the plates are lying in a horizontal plane, thereby eliminating increased pressure on the plates, toward the bottom of the stack, due to the weight of the plates above them.

It is another object of the invention to so arrange the stack of biplates in a 12 volt battery (or battery of greater voltage) in such a manner that the battery container partitions and walls maintain the optimum axial pressure on the assembled stacks.

Finally, it is yet another object of this invention to construct a recombinant lead-acid battery using the aforesaid biplates.

BRIEF DESCRIPTION OF THE DRAWINGS

FIG. 1 is an isometric representation of a grid used in a biplate according to the present invention.

FIG. 2 is a plan view of a grid for a biplate according to the present invention, the grid being comprised of woven wires.

FIG. 3 is an isometric representation of a biplate having positive and negative active materials impressed into the grid.

FIG. 4 is an isometric view of a single plate.

FIG. 5 is an exploded view of one preferred embodiment of a lead-acid battery according to the present invention.

FIG. 6 is an exploded view of another preferred embodiment of a lead-acid battery according to the present invention.

FIG. 7 is yet another exploded view of another preferred embodiment of a lead-acid battery according to the present invention.

FIG. 8 is still another exploded view of another preferred embodiment of a lead-acid battery according to the present invention.

FIG. 9 is a plan view of the first layer of plates shown in FIG. 5.

FIG. 10 is a plan view with associated sectional views of a battery cover of a battery according to the present invention.

FIG. 13 is a partial exploded view of a battery according to the present invention wherein the end placement of the battery case is shown.

FIG. 14 is an isometric view showing one preferred method of adding acid to a battery according to the present invention.

FIG. 15 is an isometric view showing placement of plugs used to stop up the acid filling holes.

DETAILED DESCRIPTION OF THE INVENTION

Figure 11:
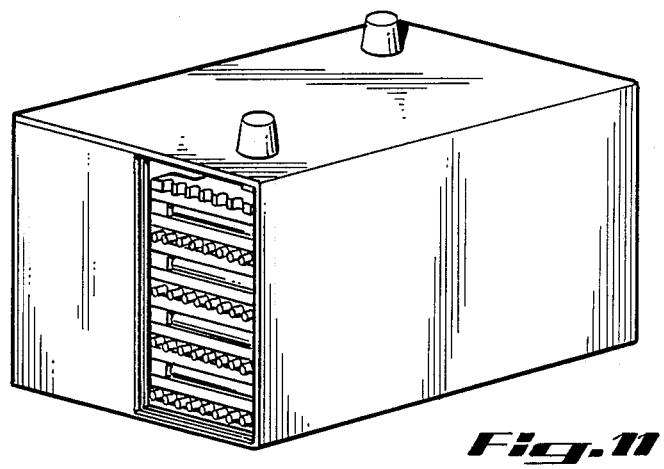
FIG. 11 is an end view with a partial cut away view one preferred battery configuration according to the present invention.

Throughout this disclosure, the term "wire" shall refer to a coextruded, coaxial wire as described in detail in U.S. Pat. No. 4,658,623 (incorporated herein by reference). The term "core material" as used throughout the specifications shall refer to fibrous, high tensile strength, non-conducting materials such as glass fiber yarn, Kevlar, or highly conductive, relatively high tensile strength metals such as aluminum and copper. The term "sheath" shall refer to the annulus of lead material surrounding the core, such lead to be pure lead (of 99.99% purity or better) or any alloy of lead. The term "biplate" shall mean a combined positive and negative plate sharing the same substrate, the portion of the biplate which has been pasted with positive active material being separated from the portion of the plate pasted with negative active material by an unpasted area of the grid.

The method of coextruding a lead sheath over a core material and the coaxial wire derived therefrom (as described in U.S. Pat. No. 4,658,623) offers the opportunity to use a pure lead or lead alloy material whose tensile strength is artificially increased by the use of a high tensile strength core (such as glass fiber yarn), whose conductivity can be significantly increased (by using a copper or aluminum wire as the core material).

The grain size of extruded lead has been documented as much finer than that of cast or wrought lead, particularly if quenching occurs very soon after extrusion. Increased tensile strength will be beneficial in retarding the well known growth of positive grids in lead-acid batteries. Small grain size will retard the effects of weight loss corrosion due to anodic attack.

Reference will now be made to the drawings. FIG. 1 shows a preferred embodiment of a grid for use in a biplate comprising several parallel strands 1 of coextruded wire. The plastic strips 2 (hereafter referred to as screeds) running perpendicular to the wire strands may be injection molded around the wires such that the manufacture of such grids could be done on a continuous basis. The grids could then be cut to the desired length and/or width. The width of the screeds will extend out beyond the outer wires on both sides of the grid for reasons referred to later.

FIG. 2 shows a grid for a biplate made by weaving wires on conventional wire weaving equipment.

FIG. 3 shows the biplate having had positive 3 and negative active materials 4 impressed into the grid. Single positive and negative plates ("end-plates") as shown in FIG. 4 will be required for the terminal stacks of the batteries of this invention. Such end-plates can be made by severing the wires 1 of the biplate (as shown in FIG. 3) at the mid-point of the biplate.

The manufacture of conventional plates for lead-acid batteries involves impressing positive and negative pastes onto separate grids, and thereafter subjecting such plates to a separate curing and drying process. This curing and drying process may involve loading the freshly pasted plates into an atmosphere with controlled humidity and temperature for a period of hours, sometimes as much as 48 hours. This process is deemed necessary: to allow the ingredients of the paste mix, one of which is usually sulfuric acid, to interact to produce desired amounts of lead oxides and lead sulfate; to reduce the free lead content of the oxide used in the paste to a low level (normally below 5% of the dry plate weight); and to reduce the moisture content of the dried plate to below (typically) 2%.

According to the invention, plates which have been freshly pasted with a paste containing no sulfuric acid ingredient are placed immediately into the container and are interleaved with separators (in the manner described below) which have been fully saturated with dilute sulfuric acid whose concentration is higher than 30% by weight. In this manner, the process of curing and drying can be avoided.

Next, I will describe assembly of a battery for conditions: (i) where the plates have been cured and dried along conventional lines and the separators used in the assembly process are dry; (ii) where the plates have been cured and dried along conventional lines and the separators have been fully saturated with dilute solution of sulfuric acid with a concentration of 30% or greater by weight; (iii) where freshly pasted plates are interleaved with dry separators; and (iv) where freshly pasted plates are interleaved with separators which have been fully saturated with a dilute solution of sulfuric acid with a concentration of 30% or greater by weight.

FIG. 5 shows stacking of the biplates 5 and positive 6 and negative 7 end-plates into a container 8 to form the basis of a 12 volt battery. The first layer of plates 9 incorporates a positive end-plate, two biplates, and an end negative plate positioned on the base of the container. The wires 10, protruding from the end-plates 6 and 7, point outward and toward the open area of the container. These plates and successive layers of separators and plates may be positioned manually or automatically into the container immediately after the pasting process.

Pieces of highly porous glass mat separators 11 of the required area and thickness to contain sufficient electrolyte in the pores thereof are then positioned on top of each of the plates in this first layer. The dimensions of the separator pieces must be such that there is adequate overlap beyond the edges of the plate to ensure adequate protection against short circuits between adjacent positive and negative plates.

There are known formulae enabling the battery designer to calculate the required volume of glass mat separator to provide sufficient electrolyte for a desired coulombic output of a battery.

The second layer of plates 12, consisting of three biplates, is then laid upon the separators in such a fashion that each part of the biplate of this second layer is of opposite polarity to the end-plate or part of the biplate directly underneath it in the first layer.

Another layer of glass mats 11 is placed upon the second layer of plates. A third layer of plates 13, comprising positive end-plate, two biplates and negative end-plate, is then laid upon the separators in the same arrangement as the first layer of plates. A layer of glass mat separators is laid upon the third layer of plates. A fourth layer of plates 14, consisting of three biplates, is laid upon the separators in the same arrangement as the second layer of plates.

This sequence of alternating layers of plate and separators is continued until the stack contains the required number of plates for the desired coulombic output of the battery. The desired electrical energy can be calculated by those skilled in the art, and will depend upon such factors as the weight and density of positive and negative active materials; the area and thickness of the plates; the area, thickness, eventual compression and porosity of the glass mat separators; the concentration of the sulfuric acid used during filling; and more.

Those skilled in the art of lead-acid battery design will also be capable of calculating the required matrix of such factors for a desired electrical energy and power output.

FIGS. 6 and 7 show other possible layouts of the stacks of plates using the concept described above. It is shown in FIG. 8 (using the layout of FIG. 5 as an example) the path of electrons during a discharge of a battery so constructed is from an external electrical circuit into the wires 10 of the positive end-plates 6; thence into the positive active material of the end-plate; vertically up and/or down through the electrolyte contained in the interleaved separator into the active material and grid of the adjacent negative plates; through the interstack connector wires in the unpasted portion of the biplate to the positive plate of the biplate; up and/or down through electrolyte contained in the interleaved separator into the active material and grid of the adjacent negative plate; through the interstack connector wires in the unpasted part of the biplate into the grid and active material part of the positive plate of the biplate and so on to the wires of the negative end-plate and out into the external electrical circuit.

The electron path for a battery containing only plate layers 9 and 12 is shown in FIG. 8 by the sequence path A through R. In effect, it is shown that the wires in the center of the biplate perform the same functions as the cast-on-strap and TTP weld found in conventional batteries.

FIG. 9 shows a plan view of the first layer of plates in FIG. 5. The integrally molded ribs 15 and partitions 16 of the container 8 combine with extensions of the plastic screeds 2 (beyond the active material width) to provide a means of locating the biplates in the container. Such an arrangement is a preferred embodiment of this invention.

When the required number of plates and separators have been stacked, the battery cover 17 shown in FIG. 10, is then forced down onto the stacks of plates until the edges of the cover 18 mate with the upper faces of the container walls and partitions 19. The amount of pressure required to compress the stack to the required thickness will be typically 5 to 7.5 pounds per square inch of plate surface. As an example, if the length and width of the pasted area of the one part (either positive or negative) of the biplate are 3 inches and 3 inches respectively, then the arrangement of a 12 volt battery shown in FIG. 5 will require between $9 \times 5 \times 6$ (=270 pounds) and $9 \times 7.5 \times 6$ (=405 pounds) of force to compress the stack to the required height. As the faces of the cover and container mate, they are bonded together by pre-applied adhesive, or by welding the two surfaces together by heat or ultrasonic means.

Figure 12:
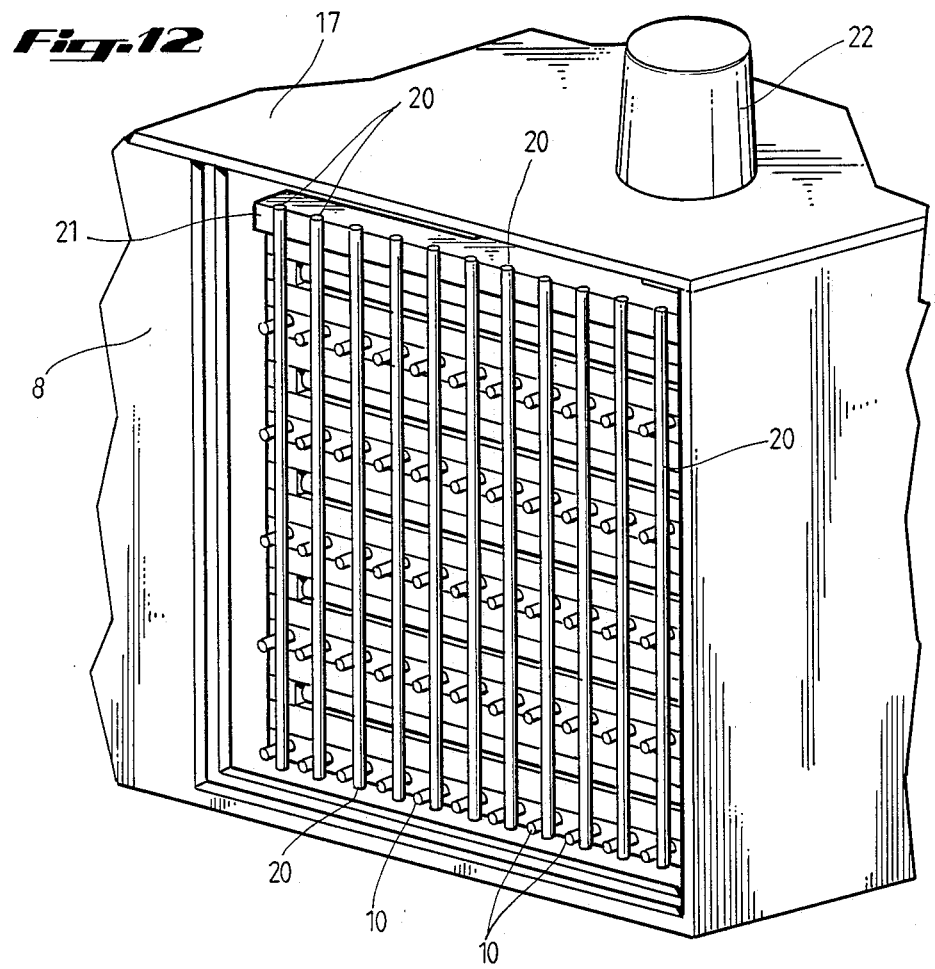
FIG. 12 is a close up of the partial cut away view shown in FIG. 11.

The end wires 10 protruding from the positive 6 and negative 7 end-plates are then resistance welded to the terminal wires 20 as shown in FIGS. 11 and 12. The terminal wires may be coextruded containing a highly conductive core such as copper or aluminum. The sheath material of the terminal wires can be similar to that of the end wires. Next, the terminal wires are resistance welded to the positive terminal block and negative terminal block 21, such blocks being integral parts of the terminals 22.

Container side pieces 23 are thereafter affixed to the container 8 and cover 17 by heat sealing, ultrasonic or other means (FIG. 13).

Further processing of the battery will depend on the methods employed in the previous assembly. If the stacks were assembled using dried plates and dry separators, or wet plates and dry separators, then the container must be turned through 90° such that the plates are in a vertical plane. Dilute sulfuric acid of a concentration between 30% and 50% is fed into the container through tubes introduced through holes 24 in the container side (FIG. 14). The rate of acid addition must be controlled to ensure complete expulsion of the air from the pores of the plates and separators. This rate will depend upon the compression which has been exerted on the separators by the mating of the container and cover. When the battery is completely flooded, the tubes must be extracted and the battery should immediately be inverted to allow the acid to drain into a sump through the holes 24. The battery should then be connected to a suitable D.C. power supply to allow electrochemical formation of the plates. During the formation process, the plates should be maintained in a vertical position.

If both plates and separators were assembled in a dry condition, then the battery may be removed for storage in inventory until such time the filling and formation process can be undertaken.

If the separators were stacked in a fully saturated condition, the battery should be put on formation immediately following the point at which the container side pieces were affixed to the container.

Following formation, the holes (FIG. 15) are then plugged with pressure relief valves 25 designed to relieve excessive gas at a pressure above, typically, 2.5 p.s.i.

Batteries of the subject invention were built using various design, assembly, and process techniques and subsequently tested. The methods of Battery assembly and subsequent electrical test results achieved are tabulated in Table 1.

Various modifications and improvements may be made to the disclosed embodiments of the invention without departing from the overall scope and spirit of the invention. For example, different paste compositions may be used to form the biplates, or various biplate orientation and stacking, configurations may be used to create a lead-acid battery according to the present invention.

TABLE 1

| DESIGN AND PERFORMANCE CHARACTERISTICS OF BATTERIES OF THIS INVENTION. | | |
|---|---|---|
| SERIAL NO. | 4J | 10E |
| BATTERY VOLTAGE | 4 | 4 |
| NO. OF LAYERS OF BIPLATES | 10 | 6 |
| AREA OF EACH PLATE | 3" × 3.25" | 3" × 3.25" |
| GRID ALLOY | 99.98% Pb | 99.98% Pb |
| GRID DESIGN | WOVEN MESH, 8 WEAVES PER INCH (FIG. 2). .060" OUTSIDE DIA., .013" GLASS FIBER CORE. WEIGHT OF BIPLATE GRID: 123 g. | 11 PARALLEL WIRES (FIG. 1) .050" OUTSIDE DIA., .013" GLASS FIBER CORE. WEIGHT OF BIPLATE GRID: 32 g. |
| POSITIVE ACTIVE MATERIAL | NON-SULFATED PASTE, 73.34 g/in$^3$ WET DENSITY, 50 g WET PASTE | NON-SULFATED PASTE, 60.87 g/in$^3$ WET DENSITY, 43 g WET PASTE |

TABLE 1-continued
DESIGN AND PERFORMANCE CHARACTERISTICS OF BATTERIES OF THIS INVENTION.

| | | | |
|---|---|---|---|
| NEGATIVE ACTIVE MATERIAL | | WEIGHT PER PLATE. NO CURING/DRYING. NON-SULFATED PASTE, 76.9 g/in$^3$ WET DENSITY. 50 g WET PASTE WEIGHT PER PLATE. NO CURING/DRYING | WEIGHT PER PLATE. NO CURING/DRYING. NON-SULFATED PASTE, 70.84 g/in$^3$ WET DENSITY. 43 g WET PASTE WEIGHT PER PLATE. NO CURING/DRYING |
| SEPARATOR | | 2 PIECES EACH 3.25" × 3.25" × .050" THICK BEFORE COMPRESSION. DEXTER TYPE APPX .040" (EACH) AFTER COMPRESSION. | 1 PIECES EACH 3.25" × 3.25" × .075" THICK BEFORE COMPRESSION. EVANE TYPE AGM APPX .060" (EACH) AFTER COMPRESSION. |
| FILLING MATERIAL | | SEPARATORS PRE-SOAKED IN 1.150 sg E$_2$SO$_4$. BATTERY SOAKED IN 1.300 sg H$_2$SO$_4$ FOR 1 HOUR AFTER ASSEMBLY. | SEPARATORS ASSEMBLED DRY. BATTERY SOAKED IN 1.350 sg H$_2$SO$_4$ FOR 1 HOUR AFTER ASSEMBLY. |
| FORMATION | | 10 AMPS FOR 6 HOURS, 5 AMPS FOR 14.4 HOURS. | 1.2 AMPS FOR 36 HOURS FOLLOWED BY 0.3 AMPS FOR 12 HOURS. |
| DISCHARGE NO. | RECHARGE NO. | | |
| 1 | | 33.4 MINS @ 5.6 A TO 3.50 VOLTS | 86 MINS @ 2.58 A TO 3.50 VOLTS |
| | 1 | 0.5 A FOR 28 HOURS | 1.2 A FOR 4 HOURS, 0.2 A FOR 8 HOURS |
| 2 | | 35.4 MINS @ 5.6 A TO 3.50 VOLTS | 101 MINS @ 2.61 A TO 3.50 VOLTS |
| | 2 | CONSTANT POTENTIAL AT 2.50 vpc | CONSTANT POTENTIAL AT 2.70 vpc |
| 3 | | 47.7 MINS @ 5.6 A TO 3.50 VOLTS | 105 MINS @ 2.59 A TO 3.50 VOLTS |
| | 3 | CONSTANT POTENTIAL AT 2.45 vpc | CONSTANT POTENTIAL AT 2.70 vpc |
| 4 | | 115.6 MINS @ 5.6 A TO 3.50 VOLTS | 106 MINS @ 2.63 A TO 3.50 VOLTS |
| | 4 | CONSTANT POTENTIAL AT 2.45 vpc | CONSTANT POTENTIAL AT 2.70 vpc |
| 5 | | 114.0 MINS @ 5.6 A TO 3.50 VOLTS | 109 MINS @ 2.64 A TO 3.50 VOLTS |
| 10 | | 125 MINS @ 5.6 A TO 3.50 VOLTS | 124 MINS @ 2.52 A TO 3.50 VOLTS |
| 15 | | 150.5 MINS @ 5.0 A TO 3.50 VOLTS | 126 MINS @ 2.60 A TO 3.50 VOLTS |
| 17 | | 189.2 MINS @ 4.22 A TO 3.50 VOLTS | 129 MINS @ 2.61 A TO 3.50 VOLTS |
| 25 | | 126 MINS @ 5.6 A TO 3.50 VOLTS | 130 MINS @ 2.64 A TO 3.50 VOLTS |
| 35 | | 102 MINS @ 5.6 A TO 3.50 VOLTS | 117 MINS @ 2.60 A TO 3.50 VOLTS |
| | | BATTERY DISMANTLED AFTER 37 CYCLES | BATTERY CYCLING PAST 41 CYCLES |
| | | 11A | 12D |
| | | 4 | 4 |
| | | 6 | 6 |
| | | 3" × 3.25" | 3" × 3.25" |
| | | Pb/.60% Sn | Pb/.1% Sb |
| | | 11 PARALLEL WIRES (FIG. 1) .050" OUTSIDE DIA., .013" GLASS FIBER CORE WEIGHT OF BIPLATE GRID: 32 g | 11 PARALLEL WIRES (FIG. 1) .050" OUTSIDE DIA., .013" GLASS FIBER CORE WEIGHT OF BIPLATE GRID: 32 g |
| | | NON-SULFATED PASTE, 60.87 g/in$^3$ WET DENSITY, 43 g WET PASTE WEIGHT PER PLATE. NO CURING/DRYING. | NON-SULFATED PASTE, 60.87 g/in$^3$ WET DENSITY, 43 g WET PASTE WEIGHT PER PLATE. NO CURING/DRYING. |
| | | NON-SULFATED PASTE, 70.84 g/in$^3$ WET DENSITY. 43 g WET PASTE WEIGHT PER PLATE. NO CURING/DRYING. | NON-SULFATED PASTE, 70.84 g/in$^3$ WET DENSITY. 43 g WET PASTE WEIGHT PER PLATE. NO CURING/DRYING. |
| | | 1 PIECES EACH 3.25" × 3.25" × .075" THICK BEFORE COMPRESSION. EVANE TYPE AGM APPX .046" (EACH) AFTER COMPRESSION. | 1 PIECES EACH 3.25" × 3.25" × .075" THICK BEFORE COMPRESSION. EVANE TYPE AGM APPX .060" (EACH) AFTER COMPRESSION. |
| | | SEPARATORS ASSEMBLED DRY. BATTERY SOAKED IN 1.350 sg E$_2$SO$_4$ FOR 1 HOUR AFTER ASSEMBLY. | SEPARATORS ASSEMBLED DRY. BATTERY SOAKED IN 1.350 sg H$_2$SO$_4$ FOR 1 HOUR AFTER ASSEMBLY. |
| | | 1.2 AMPS FOR 36 HOURS FOLLOWED BY 0.3 AMPS FOR 12 HOURS. | 1.2 AMPS FOR 36 HOURS FOLLOWED BY 0.3 AMPS FOR 12 HOURS. |
| | | 88 MINS @ 2.56 A TO 3.50 VOLTS | 67 MINS @ 2.60 A TO 3.50 VOLTS |
| | | 1.2 A FOR 4 HOURS, 0.2 A FOR 8 HOURS | 1.2 A FOR 4 HOURS, 0.2 A FOR 8 HOURS |
| | | 100 MINS @ 2.60 A TO 3.50 VOLTS | 92 MINS @ 2.60 A TO 3.50 VOLTS |
| | | CONSTANT POTENTIAL AT 2.70 vpc | CONSTANT POTENTIAL AT 2.90 vpc |
| | | 104 MINS @ 2.57 A TO 3.50 VOLTS | 102 MINS @ 2.60 A TO 3.50 VOLTS |
| | | CONSTANT POTENTIAL AT 2.70 vpc | CONSTANT POTENTIAL AT 2.90 vpc |
| | | 108 MINS @ 2.57 A TO 3.50 VOLTS | 108 MINS @ 2.61 A TO 3.50 VOLTS |
| | | CONSTANT POTENTIAL AT 2.70 vpc | CONSTANT POTENTIAL AT 2.90 vpc |
| | | 113 MINS @ 2.54 A TO 3.50 VOLTS | 113 MINS @ 2.60 A TO 3.50 VOLTS |
| | | 121 MINS @ 2.60 A TO 3.50 VOLTS | 124 MINS @ 2.61 A TO 3.50 VOLTS |
| | | 128 MINS @ 2.60 A TO 3.50 VOLTS | 114 MINS @ 2.62 A TO 3.50 VOLTS |
| | | 128 MINS @ 2.63 A TO 3.50 VOLTS | 131 MINS @ 2.62 A TO 3.50 VOLTS |
| | | 127 MINS @ 2.59 A TO 3.50 VOLTS | BATTERY DISMANTLED AFTER 21 CYCLES |
| | | 81 MINS @ 2.60 A TO 3.50 VOLTS BATTERY CYCLING PAST 41 | |

TABLE 1-continued

DESIGN AND PERFORMANCE CHARACTERISTICS OF
BATTERIES OF THIS INVENTION.

CYCLES

Having therefore fully and completely disclosed the best mode of my invention, I now claim:

1. A method for producing a gas recombining lead-acid electrochemical battery comprising:
    assembling stacks of electrochemically unformed lead containing plates in such a manner that a positive plate in a particular position in one stack is connected to a negative plate in the same relative position in an adjacent stack by a common substrate of the said positive and negative plates;
    positioning dry, highly porous, microfine glass fiber separators between said positive and negative plates;
    applying compressive force on the stacks of plates, said compressive force being provided by fixing a battery cover on a battery container containing said stacks in order to exert controlled pressure on the stacks of plates and separators;
    electrically connecting said negative plates and separately connecting all said positive plates in the terminal stacks to each other and to an external negative and an external positive terminal of the battery respectively;
    flooding the unformed battery case with acid electrolyte so that the acid electrolyte is fully absorbed into the pores of the plates and separators;
    draining excess acid electrolyte from the battery case after a predetermined soaking period has expired;
    electrochemically forming the plates in place within the battery case in such a manner that pores in the plates and separators are less than fully filled; and
    sealing the battery.

2. The method for producing the lead-acid electrochemical battery according to claim 1, wherein the pores of said highly porous microfine glass fiber separators have been fully filled by pre-soaking said separators in a solution of acid electrolyte prior to positioning said separators between said positive and negative plates.

3. The method for producing the lead-acid electrochemical battery according to claim 1 wherein said highly porous separators are formed from a ceramic.

4. A method for producing a gas recombining lead-acid electrochemical battery, comprising:
    forming electrochemically unformed, lead containing positive and negative plates which share a common substrate;
    thereafter, electrochemically forming said positive and negative plates by the tank formation method;
    assembling stacks of the electrochemically formed plates in such a manner that each positive plate in a particular position a first stack is connected to a corresponding negative plate in an adjacent stack, said corresponding plate being positioned in the same relative position within said adjacent stack, when compared to said first stack, said corresponding plate being positioned in said adjacent stack by the same substrate of the said positive and negative plates;
    positioning highly porous, microfine, glass fiber separators between said positive and negative plates;
    applying compressive force on the stacks of plates, said compressive force being provided by fixing a battery cover on a battery container containing said stacks in order to exert controlled pressure on the stacks of plates and separators.
    electrically connecting the negative plates and separately the positive plates in the terminal stacks to each other and to the external negative and positive terminals of the battery respectively;
    adding a controlled amount of acid electrolyte to each stack so that the electrolyte is substantially fully absorbed into the pores of the plates and separators; and
    sealing the battery.

5. The method according to claim 1 wherein the substrates of said positive and negative biplates are comprised of parallel, continuous pieces of reinforced wire, said wire being manufactured by an coextrusion or electrochemical deposition process, and wherein each said wire is maintained in position by at least one plastic screed positioned perpendicular to the direction of the wire, said screeds also being adapted to precisely locate the biplates in the battery container.

6. The method according to claim 4 wherein the substrates of said positive and negative biplates are comprised of parallel, continuous pieces of reinforced wire, said wire being manufactured by an coextrusion or electrochemical deposition process, and wherein each said wire is maintained in position by at least one plastic screed positioned perpendicular to the direction of the wire, said screeds also being adapted to precisely locate the biplates in the battery container.

7. The method according to claim 1 wherein the substrates of said positive and negative biplates are comprised of a woven mesh of reinforced wire, and wherein each wire is maintained in a position by at least one plastic screed running perpendicular to the direction of the wire, said screeds also being adapted to precisely locate the biplates in the battery container; and wherein each said wire is maintained in position by at least one plastic screed being positioned parallel to the direction of the wire, said screeds also being adapted to precisely locate the biplates in the battery container.

8. The method according to claim 4 wherein the substrates of said positive and negative biplates are comprised of a woven mesh of reinforced wire, and wherein each wire is maintained in a position by at least one plastic screed running perpendicular to the direction of the wire, said screeds also being adapted to precisely locate the biplates in the battery container; and wherein each said wire is maintained in position by at least one plastic screed being positioned parallel to the direction of the wire, said screeds also being adapted to precisely locate the biplates in the battery container.

9. The method according to claim 1 wherein the substrates of said positive and negative biplates are formed by welded or fused wires running at angles to each other configured to form a latticework; and wherein each said wire is maintained in position by at least one plastic screed positioned perpendicular to the direction of the wire, said screeds also being adapted to precisely locate the biplates in the battery container.

10. The method according to claim 4 wherein the substrates of said positive and negative biplates are formed by welded or fused wires running at angles to each other configured to form a latticework; and wherein each said wire is maintained in position by at least one plastic screed positioned perpendicular to the direction of the wire, said screeds also being adapted to precisely locate the biplates in the battery container.

11. The method according to claim 1 wherein the substrates of said positive and negative biplates are formed from expanded metal, and wherein such metal being lead alloy.

12. The method according to claim 4 wherein the substrates of said positive and negative biplates are formed from expanded metal, and wherein such metal being lead alloy.

13. The method according to claim 1 wherein the substrates of said positive and negative biplates are cast lead alloy.

14. The method according to claim 4 wherein the substrates of said positive and negative biplates are cast lead alloy.

15. The method of claim 5 wherein the substrate is formed in a continuous fashion, said substrates being continuously pasted with active material, said plates being obtained by cutting a said continuous screed to a desired dimension.

16. The method of claim 11 wherein the substrate is formed in a continuous fashion, said substrates being continuously pasted with active material, said plates being obtained by cutting a said continuous screed to a desired dimension.

17. The method of claim 13 wherein the substrate is formed in a continuous fashion, said substrates being continuously pasted with active material, said plates being obtained by cutting a said continuous screed to a desired dimension.

18. The method according to claim 5 wherein a core of said wire is a material with a tensile strength in excess of 6,000 p.s.i.

19. The method according to claim 7 wherein a core of said wire is a material with a tensile strength in excess of 6,000 p.s.i.

20. The method according to claim 9 wherein a core of said wire is a material with a tensile strength in excess of 6,000 p.s.i.

21. The method according to claim 1 wherein said unformed plates are stacked and interleaved with said highly porous separators in an uncured and undried state.

22. The method according to claim 4 wherein said unformed plates are stacked and interleaved with said highly porous separators in an uncured and undried state.

23. The method according to claim 1 wherein the unformed plates are stacked and interleaved with said highly porous separators in a cured and dried state.

24. The method according to claim 4 wherein the unformed plates are stacked and interleaved with said highly porous separators in a cured and dried state.

* * * * *